US005499157A

United States Patent [19]
Younessi et al.

[11] Patent Number: 5,499,157
[45] Date of Patent: Mar. 12, 1996

[54] MULTIPLEXED ELECTRONIC FUEL INJECTION CONTROL SYSTEM

[75] Inventors: Ramin Younessi, Ft. Collins; Dale A. Beckman, Fort Collins, both of Colo.

[73] Assignee: Woodward Governor Company, Loveland, Colo.

[21] Appl. No.: 336,501

[22] Filed: Nov. 9, 1994

[51] Int. Cl.$^6$ .................................................. H01H 47/00
[52] U.S. Cl. .......................................... 361/191; 361/172
[58] Field of Search ..................................... 361/152, 160, 361/166, 170, 191, 206, 171, 172; 123/445, 472, 476, 490; 251/129.01, 129.02, 129.15

[56] References Cited

U.S. PATENT DOCUMENTS

| | | |
|---|---|---|
| 2,325,878 | 8/1943 | Ray . |
| 3,622,991 | 11/1971 | Lehrer et al. ........................... 340/147 |
| 3,777,977 | 12/1973 | Regneault et al. . |
| 3,802,626 | 4/1974 | Regneault et al. . |
| 4,131,087 | 12/1978 | Williams . |
| 4,213,425 | 7/1980 | Read . |
| 4,433,355 | 2/1984 | Chew et al. ........................... 361/172 |
| 4,925,156 | 5/1990 | Stoll et al. . |
| 4,932,632 | 6/1990 | Nicol . |
| 4,941,447 | 7/1990 | Mannhardt . |
| 5,082,180 | 1/1992 | Kubo et al. . |
| 5,207,555 | 6/1980 | Trombley ............................... 361/172 |

*Primary Examiner*—Jeffrey A. Gaffin
*Attorney, Agent, or Firm*—Leydig, Voit & Mayer, Ltd.

[57] ABSTRACT

An electronic fuel injection control system having a plurality of fuel injection valves, wherein each valve is operated by an electromagnetic solenoid. The control system includes at least one driver circuit for supplying current limited power to the solenoid, at least one control circuit for controlling the current passing through the solenoid, and a multiplexing means for selectively interconnecting the at least one driver circuit and the at least one control circuit to the terminals of a selected solenoid for selectively energizing the solenoid. The multiplexing means includes two switch arrays. The first switch array has at least one switch that selectively interconnects at least one driver circuit to a first terminal of the solenoids. The second switch array has at least one switch selectively interconnecting at least one control circuit to a second terminal of the solenoids. The multiplexing means is further characterized in that the two switch arrays are interconnected among the at least one driver circuit, the at least one control circuit, and the solenoids so that closure of any single switch from each switch bank uniquely selects and energizes a single solenoid.

18 Claims, 5 Drawing Sheets

MULTIPLEXED ELECTRONIC FUEL INJECTION CONTROL SYSTEM

BACKGROUND OF THE INVENTION

1. Field of the Art

The present invention relates to electronic fuel injection systems, and more particularly, to an improved electronic fuel injection control system for multi-cylinder fuel injection control in large combustion engines.

2. Discussion of the Related Art

As is well known, electronic fuel injection systems operate by controlling a solenoid to open and close a fuel injection valve, where the fuel injection valve is electromagnetically coupled to the solenoid. When the valve is opened, fuel is injected into a cylinder bore. In its simplest form, such a fuel injection valve may be opened by applying a constant voltage across the terminals of the solenoid, thereby energizing the solenoid and opening the valve. However, and as described in copending U.S. patent application S/N 08/083,613 (the '613 application)—filed Jun. 28, 1993, now U.S. Pat. No. 5,398,724 issued Mar. 21, 1995, entitled High Speed Electrically Actuated Gaseous Fuel Admission Valve, assigned to the assignee of the present invention, and hereby incorporated by reference—in very large internal combustion engines it is desired to provide balanced operation of the solenoids for each cylinder. This balanced operation is provided in part by circuitry adapted to control the current flow through the solenoid, and in part through a central controller which generates electronic control signals for operating the control circuitry.

More specifically, the control circuitry includes separate driver and control circuits disposed on opposite sides of the solenoids. The driver circuit delivers a current-limited energizing voltage of approximately one hundred volts to one terminal (hereinafter "drive terminal") of each solenoid. The control circuit is electrically connected to the other terminal (hereinafter "control terminal") of each solenoid, and operates to complete the current path through the solenoid by controllably and intermittently grounding the control terminal so as to effect a predetermined current flow through the solenoid. Both the driver and control circuits have an input signal generated by a central or master controller, which serves to turn on and off the operation of the respective driver and control circuits.

Typically, such prior art systems have a dedicated driver and control circuit associated with each solenoid. The driver and control circuits and, therefore, the solenoids are independently operated and controlled by the central controller. Some prior art systems are known, however, to have only a single driver circuit which has its output electrically connected to the drive terminal of each solenoid. Independent control circuits, however, remain dedicated to each solenoid in order to maintain independent control over the individual solenoids.

Regardless of whether the system utilizes a single or multiple driver circuit, the system operates as follows: Control signals generated by the central controller are input to the appropriate driver and control circuits to energize a given solenoid and, thus, open the corresponding fuel injection valve. Precise and repeated operation of the fuel injection valve is achieved by effecting tight control over the current through the solenoid. In this regard, it is desired to open the valve quickly by initially applying a relatively large magnitude current through the solenoid. Then, the current is reduced to a lower magnitude holding current, sufficient to retain the valve in its fully open position. Finally, rapid closure of the fuel injection valve is achieved by breaking the current path through the solenoid and quickly dissipating the energy stored therein.

The precision control of the current through the solenoid and, thus, the operation of the fuel injection valve described above is achieved by the control circuit being configured to intermittently ground the control terminal so as to pulse-width modulate the voltage applied across the terminals of the solenoid. Since the control circuitry utilized to effect this current control is duplicated for each solenoid, a more balanced operation among the cylinders, and thus improved engine operation, is achieved.

While such systems do provide effective control of large multi-cylinder internal combustion engines, further improvements are desired. In this regard, cost is always a significant factor in any system design. It is observed that the cost associated with the prior art systems is inflated in some measure due to the replication of the driver and control circuitry for each cylinder. This replication in circuitry is particularly noteworthy since, due to the sequential firing of the cylinders, typically only one solenoid will be energized at any given time. Accordingly, only one driver and one control circuit will be active at any given time.

Additional shortcomings of the prior art systems are reliability and power consumption. As the number of system components is increased, the overall system reliability is decreased, due to the normal lifetime and expected failure of the individual components. Also, the excessive circuitry increases the power demands of the system.

The problems highlighted above are further compounded as the number of engine cylinders is increased. To be sure, many large stationary internal combustion engines, have sixteen to twenty cylinders. In such systems, the expense and other shortcomings of the prior art become particularly acute.

SUMMARY OF THE INVENTION

Accordingly, it is a primary object of the present invention to provide an electronic fuel injection control system having fewer electronic components, such as those components comprising the driving and control circuitry, than systems presently known in the prior art.

A related object of the present invention is to provide an electronic fuel injection control system having a lower cost than prior systems.

Another object of the present invention is to provide an electronic fuel injection control system having a reduced circuit board space.

It is still another object of the present invention to provide an electronic fuel injection control system having a reduced package size, thereby reducing the system's spatial demands.

Another object of the present invention is to provide an electronic fuel injection control system having lower power requirements than prior art systems.

Still another object of the present invention is to provide an electronic fuel injection control system having an improved reliability over systems in the prior art.

Yet another object of the present invention is to provide an electronic fuel injection control system affording more balanced operation among the fuel injection valves and, thus, yields improved engine performance.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an electronic fuel injection control system of the type having a plurality of fuel injection valves, wherein each valve is operated by an electromagnetic solenoid. The control system includes at least one driver circuit for supplying power to the solenoid, at least one control circuit for controlling the current passing through the solenoid, and a multiplexing means for selectively interconnecting the at least one driver circuit and the at least one control circuit to the terminals of a selected solenoid for selectively energizing the solenoid. The multiplexing means includes two switch arrays. The first switch array has at least one switch that selectively interconnects at least one driver circuit to a first terminal of the solenoids. The second switch array has at least one switch selectively interconnecting at least one control circuit to a second terminal of the solenoids. The multiplexing means is further characterized in that the two switch arrays are interconnected among the at least one driver circuit, the at least one control circuit, and the solenoids so that closure of any single switch from each switch bank uniquely selects and energizes a single solenoid.

Having summarized the present invention above, the discussion will now be directed to a presently preferred embodiment of that invention. In a preferred embodiment, the at least one driver circuit serves to apply a power source of approximately one hundred volts to the drive terminals of the solenoids. The driver circuit, however, includes a current limiting feature that provides circuit protection in the event that the solenoid is inadvertently shorted to ground. The driver circuit also includes a means for rapidly dissipating the energy stored in the solenoid so that the fuel injection valve is quickly closed at the end of the fuel injection cycle.

The at least one control circuit employs a feedback term to actively control the current passing through the solenoid. Indeed, each control circuit includes a switch that serves to intermittently turn the solenoids on and off by effectively grounding the control terminals thereof. Specifically, when the driver circuit has applied the voltage of approximately one hundred volts to the drive terminal of a solenoid, and the control circuit grounds the control terminal of that solenoid, that solenoid is turned on so as to pass current through it.

If the control circuit switch were permitted to remain on continuously, the current passing through the solenoid would far exceed the desired level. Accordingly, the control circuit utilizes a feedback term to monitor the current passing through the solenoid and controllably open and close the switch so as to control the current flow through the solenoid. In this regard, a separate means is provided to ensure that there is a continuous current path through the solenoid during the fuel admittance cycle. Moreover, the inductance of the solenoid ensures that the change in current flow through the solenoid (e.g., di/dt) is controlled.

BRIEF DESCRIPTION OF THE DRAWINGS

The accompanying drawings incorporated in and forming a part of the specification, illustrate several aspects of the present invention, and together with the description serves to explain the principals of the invention. In the drawings.

Reference will now be made in detail to various present preferred embodiments of the invention, examples of which are illustrated in the accompanying drawings.

DETAILED DESCRIPTION OF THE PREFERRED EMBODIMENTS

Figure 1:
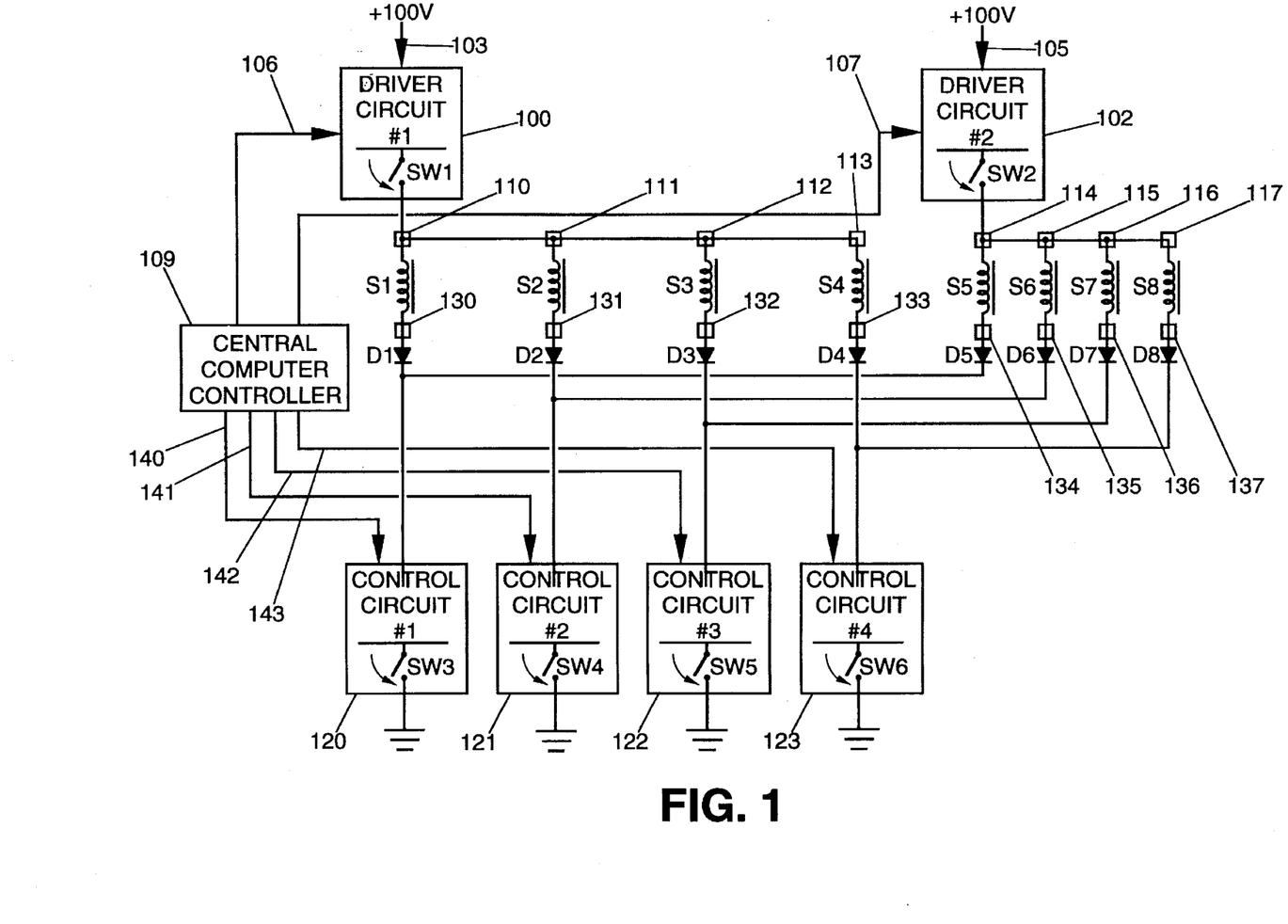
FIG. 1 is a top-level block diagram of a preferred embodiment of the fuel injection control system of the present invention, as adapted for use in an eight cylinder engine.

FIG. 1 shows a block diagram of a preferred embodiment of the fuel injection control system of the present invention, as adapted for use in an eight cylinder engine. In this embodiment, there are two driver circuits 100 and 102. Each driver circuit has a one hundred volt dc input 103 and 105, and a control input 106 and 107, generated by a central computer 109 for commanding the driver circuit to apply the one hundred volt input to a group of drive terminals (the drive terminals are designated by reference numerals 110 through 117) which include the selected solenoid.

Four control circuits, 120 through 123 are shown. The control circuits serve to control the current flow through the operative solenoid. This current control is achieved by controllably grounding a group of control terminals (control terminals are designated as 130 through 137) which include the operative solenoid, so as to pulse width modulate the one hundred volts supplied from the driver circuit to the drive terminal of the selected solenoid. That is, when the control terminal of the operative solenoid is grounded, the one hundred volts applied to the driver terminal by the driver circuit is then applied across, and thereby energizes, the solenoid. When, however, the ground connection at the control terminal is broken, the one hundred volts is no longer applied across the solenoid and the magnetic field of the solenoid begins to collapse. As will be described in reference to FIG. 2, means are provided in connection with the driver circuit to provide a continued current path, so that the energy stored in the solenoid may be dissipated. In this regard, the control circuit may intermittently establish and break the ground connection with the control terminal of the operative solenoid, but, during the operative time of the fuel injection cycle as determined by the central computer 109, the system nevertheless maintains a continuous flow of current through the solenoid sufficient to retain the fuel injection valve in its fully open position.

Each control circuit has a control signal input 140 through 143. These control signals 140–143 combine with the driver circuit control signals 106 and 107 to select the operable solenoid. More particularly, and as shown in the figure, the output of driver circuit #1 100 is electrically connected to the drive terminal of solenoids S1, S2, S3, and S4. The output of driver circuit #2 102 is electrically connected to the drive terminal of solenoids S5, S6, S7, and S8. In similar fashion, the outputs of the control circuits are connected to the control terminals of the solenoids as follows: control circuit #1 120 is connected to S1 and S5; control circuit #2 121 is connected to S2 and S6; control circuit #3 122 is connected to S3 and S7; and control circuit #4 123 is connected to S4 and S7.

As previously mentioned, and as described in the '613 application, there is a class of engines, such as large stationary power plant engines, where significant advantages can be achieved from precise control of the fuel injection cycle. In this regard, the word "precise" is used to distinguish the general level of precision normally associated with, for example, automotive applications. In this class of engines, precise control of the fuel injection cycle is achieved by opening the fuel injection valve at a given point in time by applying a relatively large magnitude current to the solenoid, retaining the valve in the open position with a smaller magnitude holding current, and rapidly closing the valve at the proper time instant.

In this environment, separate control and driver circuits are particularly desired. As previously described, the driver circuit provides a current-limited supply voltage to the drive terminals of the solenoids, and the control circuit operates to control the current flow therethrough. Separate means are provided and associated with the driver circuit, however, to: (1) maintain a continuous flow of current through the solenoid during those times within the fuel injection cycle that the control circuit breaks the ground connection with the solenoid so as to decrease the current flow therethrough; and (2) rapidly dissipate the energy stored in the solenoid at the end of the fuel injection cycle, so that swift closure of the fuel injection valve is achieved. For these reasons, it is preferred to have separate control and driver circuits disposed on opposing sides of the solenoids.

In this environment, the invention resides in associating multiplexing means with switches in the respective control and driver circuits. Accordingly, a multiplexing means having first and second switch arrays selectively interconnects the driver circuits 100 and 102 and the control circuits 120–123 to the drive and control terminals, respectively, of the solenoids. The first switch array includes switches SW1 and SW2, which are controlled by the central computer 109 and form a part of the driver circuits. Similarly, the second switch array includes switches SW3–SW6, which are controlled by the central computer 109 and form a part of the control circuits. In a preferred embodiment, the switches SW1–SW6 are implemented as transistor switches.

The multiplexing means of the preferred embodiment also includes the control logic and control signals associated with the central computer 109 that are responsible for actuating the appropriate driver and control circuits at the proper time during the fuel injection cycle.

Current blocking diodes D1–D8 are electrically connected in series with solenoids S1–S8 to insure unidirectional current flow through the solenoids. As will be understood from the discussion that follows, the blocking diodes D1–D8 help insure that additional solenoids are not energized. The blocking diodes D1–D8 further serve to maintain the integrity of the current control through the operative solenoid.

In order to energize solenoid S1, for example and in view of the multiplexing means described above, the computer 109 sends the appropriate control signals to driver circuit #1 100 and control circuit #1 120, which close switches SW1 and SW3, thereby creating a direct current path through S1. As another example, to create a direct current path through, and thereby energize, solenoid S7, the computer 109 sends the appropriate control signals to driver circuit #2 102 and control circuit #3 122, which close switches SW2 and SW5.

It should be appreciated that without the blocking diodes D1–D8, when switches SW1 and SW3 are closed to create a direct current path through S1, additional current paths between driver circuit #1 and control circuit #1 would be created. For example, one additional current path would be created through S2 in the forward direction, S6 in the reverse direction, and S5 in the forward direction. Another current path would be created through S3 in the forward direction, S7 in the reverse direction, and S5 in the forward direction. A third additional current path would be created through S4 in the forward direction, S8 in the reverse direction, and S5 in the forwards direction. Similar stray current paths would also be created when other solenoids are selected.

Undesirably, the current passing through the additional paths may be sufficient to energize other solenoids (i.e., S2–S8), particularly solenoid S5 which passes current from all three additional paths. Furthermore, the control circuits are unnecessarily complicated since they must account for the accumulation of all current paths, rather than merely the single direct current path. Inclusion of the blocking diodes D1–D8, therefore, advantageously eliminates the additional current paths and thus the potential to energize other solenoids. Moreover, the blocking diodes simplify the control circuits.

In reference to the first example presented above, it is understood that when the computer 109 sends the appropriate control signal to driver circuit #1 100, the one hundred volt dc voltage is applied by the driver circuit #1 100 to the drive terminal of solenoids S1, S2, S3, and S4. Similarly, when the computer 109 sends the appropriate control signal to control circuit #1 120, the output of that circuit intermittently grounds the control terminals of S1 and S5. Since, however, the control terminals of S2 through S4 are floating (i.e., not grounded), the voltage applied to the drive terminals 111 through 113 is of no consequence. Similarly, when the drive terminals of S5 through S8 are floating, the fact that the control terminal 134 of solenoid S5 is grounded is of no consequence.

The following table illustrates the driver and control circuits which must be activated in order to energize any given solenoid:

| Solenoid | Driver Circuit | Control Circuit |
|----------|----------------|-----------------|
| S1 | # 1 (item 100) | # 1 (item 120) |
| S2 | # 1 (item 100) | # 2 (item 121) |
| S3 | # 1 (item 100) | # 3 (item 122) |
| S4 | # 1 (item 100) | # 4 (item 123) |
| S5 | # 2 (item 102) | # 1 (item 120) |
| S6 | # 2 (item 102) | # 2 (item 121) |
| S7 | # 2 (item 102) | # 3 (item 122) |
| S8 | # 2 (item 102) | # 4 (item 123) |

Multiplexing the output signals of the driver and control circuits in the manner shown in the figure and described above allows the total number of circuit components to be greatly reduced from the number required by prior art systems, in which the sophisticated control circuitry was duplicated for each solenoid.

Figure 2:
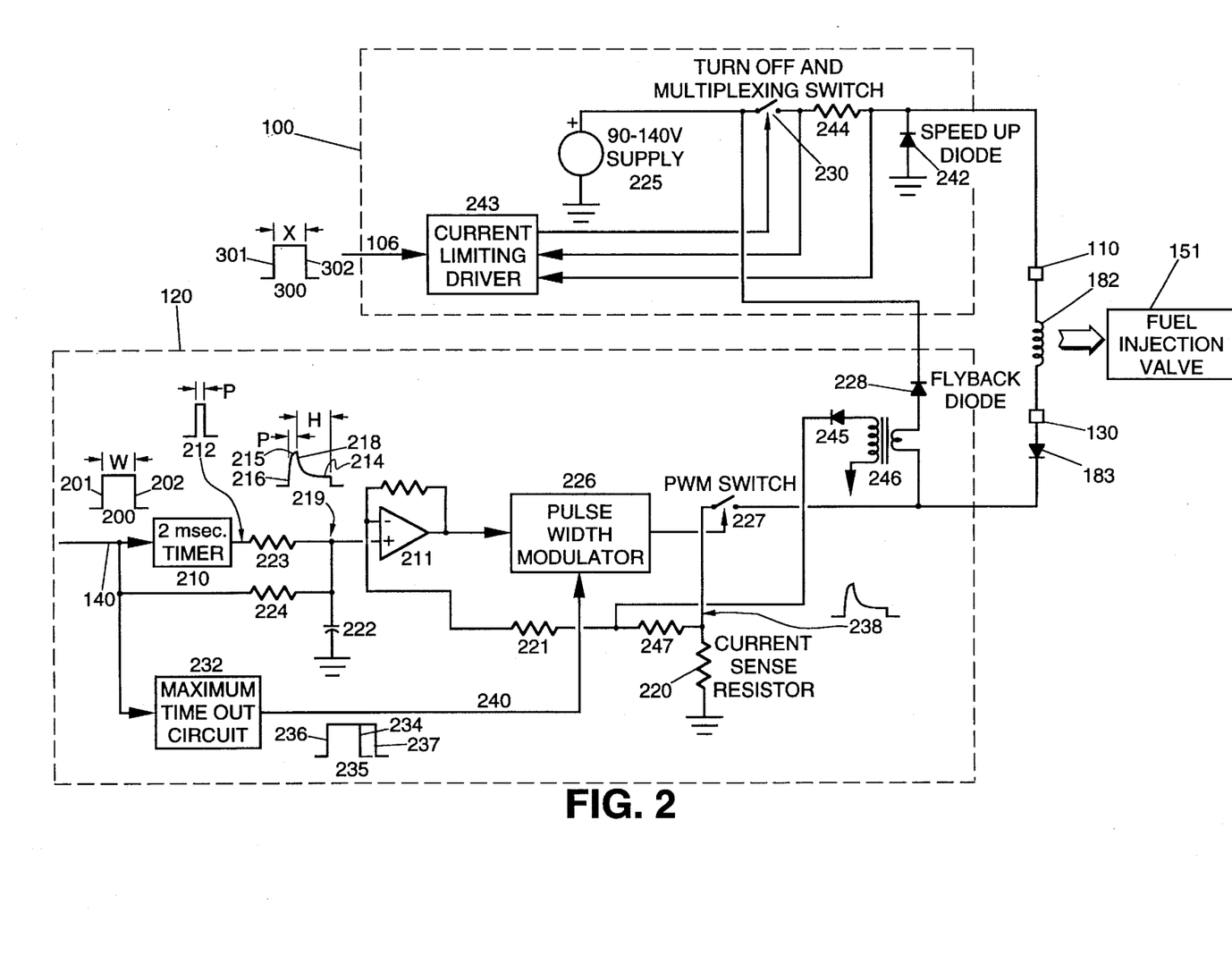
FIG. 2 is a schematic diagram showing the primary circuit elements of both the driver and control circuits, and the interconnection of these elements with a selected solenoid.

Assume now that it is desired to energize solenoid S1, whereby driver circuit #1 and control circuit #1 are activated. In this regard, reference is made to FIG. 2 to discuss the detailed operation of the driver and control circuitry of a preferred embodiment of the present invention. The particular control and driver circuits 120 and 100 of a preferred embodiment are shown in FIG. 2 as superimposed in broken lines.

The control circuit has a single control input 200, and the driver circuit has a single control input 300. Input signal 200 has a leading edge 201, a trailing edge 202, and a time duration between the leading and trailing edges designated as "W". Similarly, input signal 300 has a leading edge 301, a trailing edge 302, and a time duration "X". The input signals 200 and 300 dictate the controlled energization of the solenoid 182 and, thus, the open and close instances of the fuel injection valve 151.

The input pulse 300 occurs at the same time that the input pulse 200 occurs. The leading edge 201 of pulse 200 is coincident with the leading edge 301 of pulse 300, and the trailing edge 202 of pulse 200 is coincident with the trailing edge 302 of pulse 300. Indeed, the pulses 200 and 300 differ only in respect to their repetition frequency, in that pulse 200 will be sent to control circuit 120 (see FIG. 1) when energizing solenoids S1 and S5, whereas pulse 300 will be sent to driver circuit 100 (see FIG. 1) when energizing solenoids S1, S2, S3, and S4.

The pulses are produced by the central computer controller 109, but contain insufficient energy for directly operating the fuel injection valve. In addition, simple digital pulses would not be capable of realizing the exacting current control through the solenoid that is required to achieve the balanced fuel injection sought by the illustrated embodiment. Consequently, driver circuitry is provided for driving the electromagnetic circuitry of the solenoid 182 in response to the pulses 200 and 300.

The pulse 200 is initially passed through a timer 210. In the preferred embodiment, the timer is a one millisecond timer, the output of which is passed through biasing circuitry to the non-inverting input of a current control amplifier 211. The purpose of the one millisecond timer 210 is to divide the width "W" of the input pulse 200 into two intervals, a pull-in phase (designated "P") of one millisecond, which provides the solenoid 182 with a high energy pull-in current to assure rapid valve opening, and a hold-in phase (designated "H") which provides a hold-in current for maintaining the fuel injection valve in the open position.

The one millisecond pulse 212 and the input pulse 200 are added together through the summing resistors 223 and 224 and filtered by capacitor 222 to create the current demand pulse 219. Thus, the composite pulse 219 is seen to have two levels, a first or higher level 215 which, in the illustrated embodiment of the invention, is representative of an output current of fourteen amperes, and a second or lower level 214 which, in the same illustrated embodiment, is representative of an output current of four amperes.

The "P" pull-in phase in this preferred embodiment is set to be about one millisecond, and has a leading edge 216 which is coincident with the leading edge 201 of the input pulse. The trailing edge 218 of the one millisecond pulse then occurs one millisecond after the leading edge 216, providing an interval of one millisecond for a fourteen ampere drive to the solenoid 182. That one millisecond, fourteen ampere interval "P" is then followed by a hold-in phase "H" in which the drive current is established at four amperes.

The current control amplifier 211 has an input coupled to the inverting input of the amplifier which is produced by a current sensing resistor 220 which, as will be described below, senses the magnitude of the current passing through the solenoid 182. That signal is passed through a input resistor 221 and coupled to the inverting input 211, where it is matched with the current demand pulse 219.

The amplifier 211 has an output that drives a pulse width modulator 226 which controllably closes a control switch 227 to effectively ground the control terminal 130 of the solenoid 182 through resistor 220. In a preferred embodiment, the valve of resistor 220 is 0.1 Ohm. Therefore, during interval "P" when fourteen amperes of current are drawn through solenoid 182 and resistor 220, there is a voltage drop of only 1.4 volts across resistor 220. Thus, this 1.4 volts at the control terminal 130 is effectively ground in reference to the approximately 100 volts applied to the drive terminal 110.

The current drawn through the current sensing resistor 220 matches the demand current 219 at the capacitor 222. Due to the two level nature of the current demand pulse 219, the current sensed in the resistor 220 is first at a high level (fourteen amperes in the illustrated embodiment) for a period of one millisecond, then reverts to a lower level (four amperes in the illustrated embodiment) for the duration of the width of the input pulse 200. This two interval drive pulse 219 results in a high current being passed through the solenoid 182 initially (on the order of fourteen amperes) thereby insuring a rapid opening of the fuel injection valve. Then, to avoid any damage to the circuit's components which might result from a sustained current of this level and to enable the rapid collapse of the magnetic field in the solenoid 182, the current is dropped in the hold-in phase to a level (four amperes in the illustrated embodiment), which is still sufficient to hold the fuel injection valve fully open. Advantageously, this lower hold-in current also results in less heat build-up in the driver circuitry than would occur with higher current levels. Since power consumption is directly related to the square of the current, such a current reduction provides a drastic reduction in power. Thus, the two phase current control not only affords rapid opening and closing of the fuel injection valve, but also achieves a substantial savings in power consumption and improved thermal conditions.

In the illustrated embodiment, the pulse width modulator 226 is a circuit which operates at a relatively high frequency to produce an output voltage having a controllable or modulated level for powering the solenoid 182. More particularly, the pulse width modulator 226 controls the duty cycle of a control switch 227 to cause a current flow through the solenoid 182 and the sensing resistor 220 (sensed through the input resistor 221) to match the level of the drive current demanded by the complex input pulse 219. It will be appreciated that, although other drive schemes and modulation means can be employed, the pulse width modulation as described above is presently preferred. The pulse width modulation applied by the circuit 226 is one possible mechanism for controlling the current through the solenoid 182 to insure consistent valve operation from cycle to cycle. Thus, other schemes capable of controlling current flow in the solenoid 182 which can rapidly and repeatedly open and close the fuel injection valve might also be appropriate.

As will be appreciated from the description that follows, several important features of a preferred embodiment of the present invention are achieved by a driver switch 230, which is in series circuit relationship with a driving power supply 225, a current sensing resistor 244, the solenoid 182, the blocking diode 183, the control switch 227 and the current sensing resistor 20. Whenever the switches 230 and 227 are closed, a current path is completed for current to flow from the power supply 225 through the driver switch 230, resistor 244, the solenoid 182, the blocking diode 183, the control switch 227, and the sensing resistor 220 to the power supply common. When the control switch 227 is opened during the off periods of the pulse width modulated duty cycle, a path for continued current flow is provided by means of a flyback diode 228. During this time, a current transformer 246 and diode 245 produce a current proportional to the solenoid current 182. This current is converted to a voltage by resistors 247 and 220, which is sensed by the input resistor 221. Thus, by virtue of the energy stored in the solenoid during the closed intervals of the control switch 227, during open intervals of the control switch 227 a continued but diminishing current flows through the path comprising the driver switch 230, current sensing resistor 244, solenoid 182, blocking diode 183, transformer 246, and flyback diode 228. This circuitry effectively enables the current control amplifier 211 to continuously monitor the current through solenoid 182 during intervals in which the control switch 227 is both open or closed.

Input pulse 300 instructs a driver 243 to close the driver switch 230, and the switch 230 remains closed throughout the entire duration of pulse 300. It can be appreciated that, since the pulses 200 and 300 are coincident, the driver switch 230 will remain closed throughout the entire period that the solenoid 182 is energized and, thus, the fuel injection valve 151 is open. In contrast, the control switch 227 will intermittently open and close throughout the pulse 200 period, so as to control the current through the solenoid 182. During times within the fuel injection cycle that the control switch 227 is open, means, including flyback diode 228 and driver switch 230, are provided to ensure continuous current flow through the solenoid sufficient to maintain the fuel injection valve 151 in its fully opened position.

Selectively activated turn-off circuitry is provided for terminating the current through the solenoid 182 and collapsing the magnetic flux within its core, at the termination of the firing pulses 200 and 300. In the illustrated embodiment, such selectively activated circuitry comprises the driver switch 230, a speed-up diode 242, and a current limiting driver 243. The current limiting driver 243 turns the driver switch 230 on when the input pulse 300 is present and turns the driver switch 230 off when the pulse 300 is off. The driver 243 monitors the voltage across current sense resistor 244. If the voltage across the resistor 244 exceeds an internal set point, the driver 243 will open the driver switch 230 until the next input pulse 300 is received. This provides short circuit protection in case the solenoid is shorted. It should be appreciated that this short circuit protection also acts to protect the circuitry in the event that the control switch 227 were to fail in the closed position. As previously described, if the control switch 227 were to remain in the closed position, the current flow through the solenoid 182 would continually increase. Before this current flow reaches a dangerous, circuit damaging level, however, the current limiting protection provided by driver 243 and the driver switch 230 will interrupt the current flow, thus protecting the circuit.

Separate means are provided in connection with the driver switch 230 to collapse the magnetic field of the solenoid so that the energy stored therein may be rapidly dissipated at the end of the fuel injection cycle, thereby rapidly closing the fuel injection valve. In this regard, during the fuel injection cycle the driver switch 230 is normally maintained in a closed position. The trailing edge 302 of the firing signal 300, however, signals it to open. A speed-up diode 242 is coupled in inverse parallel relationship with the solenoid 182 and is positioned in the circuit with respect to the driver and control switches 230, 227, such that at the termination of the drive pulse 300, when the driver switch 230 is opened to uncouple the power supply 225 from the solenoid 182. The control switch 227 is also opened at this time. Accordingly, the speed-up and flyback diodes 242 and 228 combine to rapidly return the energy stored in the solenoid 182 to the power supply 225. That is, when the switches 227 and 230 are opened, a closed loop path is formed by the speed-up diode 242, solenoid 182, blocking diode 183, transformer 246, flyback diode 228, and power supply 225. This causes the rapid collapse of energy in the coil 182, thereby assuring rapid closure of the fuel injection valve. Thus, when the turn-off circuitry is activated, the solenoid 182 is reverse biased with respect to the power supply to achieve rapid dissipation of the stored energy and, thus, rapid closure of the fuel injection valve 151.

In order to prevent excessive dwell times (i.e., duration that the fuel injection valve 151 is open), the control circuit is provided with a protection means. To this end, the input pulse 200 is coupled not only to the turn-on timer 210, but also to a maximum time-out timer 232 which can instruct the pulse width modulator 226 to open the control switch 227. The circuitry 232 is configured, in the normal mode, to open the switch 227 at the trailing edge 202 of the firing signal 200. The circuit 232 performs its safety function by establishing a maximum ON period for solenoid 182. That period can be set at, for example, forty-five milliseconds, such that the timer has an output pulse shape as illustrated at 235. That output pulse shape includes an edge 236 coincident with the rising edge 201 of the firing signal 200, and a trailing edge 237 which occurs at the termination of the maximum interval (such as forty-five milliseconds). If the trailing edge 237 occurs before the trailing edge 202 of the firing signal 200, that trailing edge 237 acting via control line 240 causes the opening of the control switch 227 to prevent the solenoid 182 from holding the fuel injection valve open too long. However, in the normal course, a dotted trailing edge 239 is coincident with the trailing edge 202 of the firing signal 200 and causes the opening of the control switch 227 before the safety function of the circuitry 232 engages.

Figure 3:
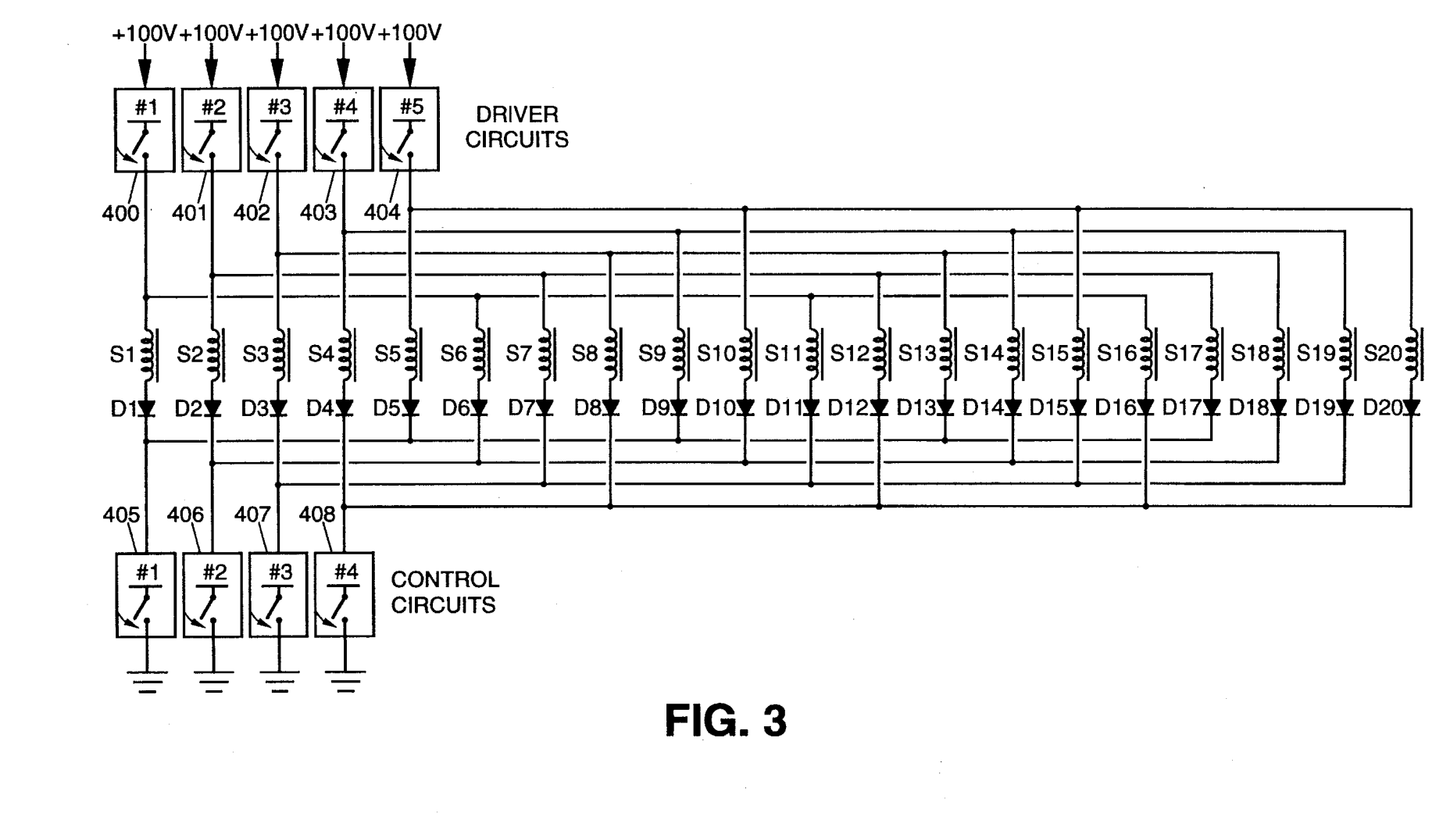
FIG. 3 is a top-level diagram of a preferred embodiment of the fuel injection control system of the present invention, as adapted for use in a twenty cylinder engine, wherein only one cylinder fires at a time.

FIG. 3 shows a schematic diagram of a preferred embodiment of the fuel injection control system of the present invention, as adapted for use in a twenty cylinder engine, wherein only one cylinder fires at a time. This embodiment utilizes five driver circuits 400–404 and four control circuits 405–408. The particular circuitry employed in the driver circuits and in the control circuits is the same as that shown and described in reference to FIG. 2. Although this information can be ascertained from the figure, the following table illustrates the driver and control circuits which must be activated in order to energize any given solenoid:

| Solenoid | Driver Circuit | Control Circuit |
| --- | --- | --- |
| S1  | # 1 (Item 400) | # 1 (Item 405) |
| S2  | # 2 (Item 401) | # 2 (Item 406) |
| S3  | # 3 (Item 402) | # 3 (Item 407) |
| S4  | # 4 (Item 403) | # 4 (Item 408) |
| S5  | # 5 (Item 404) | # 1 (Item 405) |
| S6  | # 1 (Item 400) | # 2 (Item 406) |
| S7  | # 2 (Item 401) | # 3 (Item 407) |
| S8  | # 3 (Item 402) | # 4 (Item 408) |
| S9  | # 4 (Item 403) | # 1 (Item 405) |
| S10 | # 5 (Item 404) | # 2 (Item 406) |
| S11 | # 1 (Item 400) | # 3 (Item 407) |
| S12 | # 2 (Item 401) | # 4 (Item 408) |
| S13 | # 3 (Item 402) | # 1 (Item 405) |
| S14 | # 4 (Item 403) | # 2 (Item 406) |
| S15 | # 5 (Item 404) | # 3 (Item 407) |
| S16 | # 1 (Item 400) | # 4 (Item 408) |
| S17 | # 2 (Item 401) | # 1 (Item 405) |
| S18 | # 3 (Item 402) | # 2 (Item 406) |

-continued

| Solenoid | Driver Circuit | Control Circuit |
| --- | --- | --- |
| S19 | # 4 (Item 403) | # 3 (Item 407) |
| S20 | # 5 (Item 404) | # 4 (Item 408) |

It can be appreciated from the foregoing, that a substantial reduction in the circuitry is achieved as the number of cylinders in the engine increases. For example, in the twenty cylinder engine as shown in FIG. 3, the prior art systems would have required twenty different control circuits, rather than the four as shown in FIG. 3.

Figure 4:
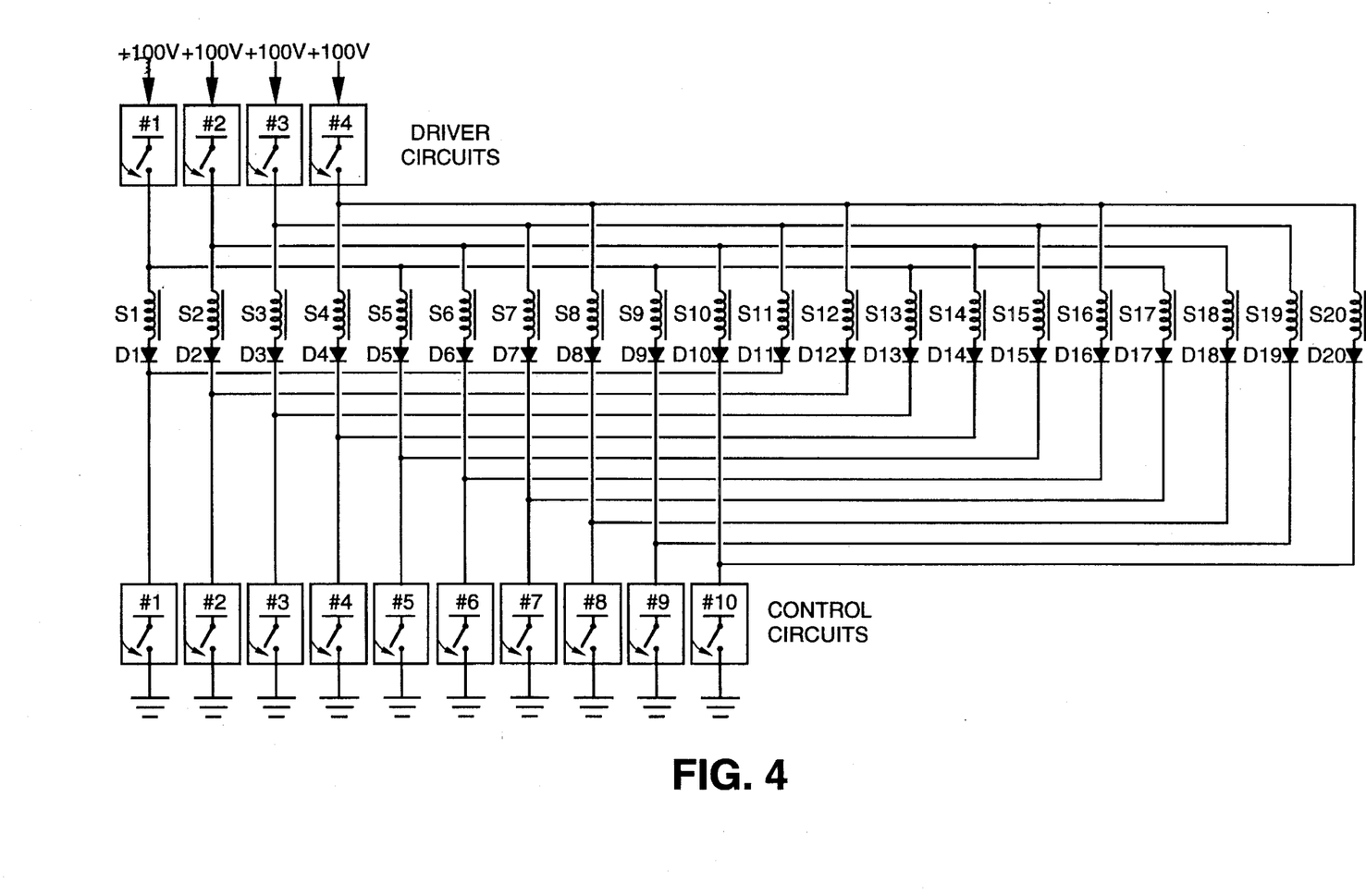
FIG. 4 is a top-level diagram of a preferred embodiment of the fuel injection control system of the present invention, as adapted for use in a twenty cylinder engine, wherein two adjacent cylinders may fire simultaneously.

FIG. 4 shows a schematic for a preferred embodiment of the fuel injection control system of the present invention, as adapted for use in a twenty cylinder engine, wherein two cylinders may fire in such close sequence that the respective fuel injection valves, at some point in the cycle, will be opened within a common time period. Therefore, the multiplexing scheme for the driver and control circuits must be configured so that any two adjacent solenoids may be energized within a common time period. In this embodiment, there are four driver circuits and ten control circuits. As can be verified from the figure, any two adjacent solenoids can be energized at one time. For example solenoids S1 and S2 are energized by activating driver circuits #1 and #2 and control circuits #1 and #2. Solenoids S18 and S19, for example, are energized by activating driver circuit #2 and #3 and control circuits #8 and #9. As a final example, cylinders 12 and 13 are simultaneously energized by activating driver circuits #1 and #4 and control circuits #2 and #3. Since an exhaustive table showing all possible combinations of pairs of adjacent solenoids that can be simultaneously energized would be extremely lengthy, one is not presented here. However, this information may be more easily ascertained from inspecting the interconnections between the various solenoids and control and driver circuits as shown in the figure.

Figure 5:
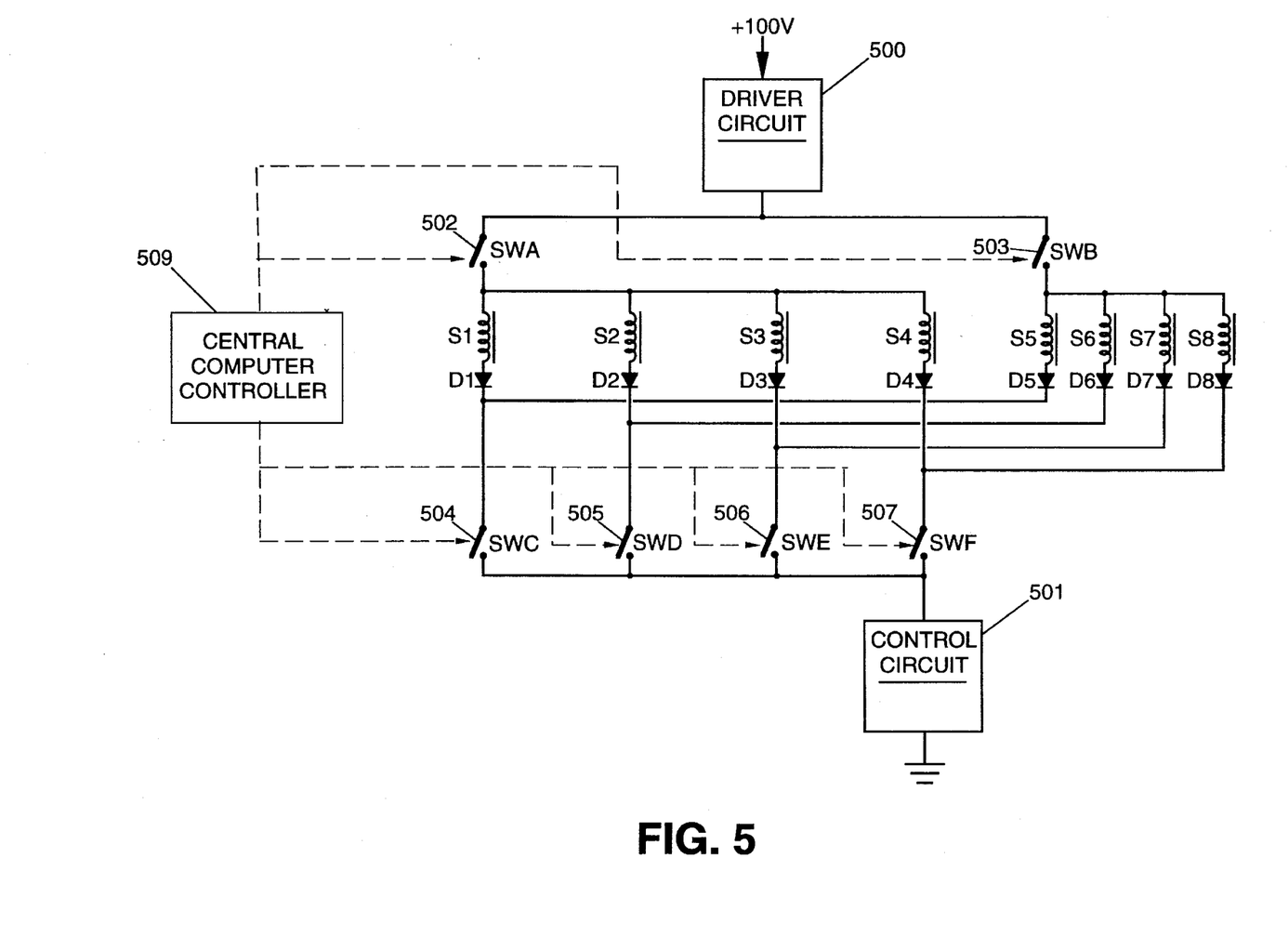
FIG. 5 is a top-level diagram showing an alternative embodiment of the present invention.

FIG. 5 shows an alternative embodiment of the present invention. In this embodiment, a slightly different multiplexing scheme is used, whereby—in systems in which only a single solenoid is energized at a given time—only a single driver circuit and single control circuit are utilized. In this embodiment, the multiplexing means includes switches SWA–SWF that effect the proper connection between the driver and control circuits to the various solenoids. Specifically, switch SWA, when closed, will connect the output from the driver circuit 500 to the drive terminals of solenoids S1–S4. Similarly, when switch SWB is closed the output from the driver circuit 500 will be applied to solenoids S5–S8. It should be appreciated that SWA and SWB are controlled by a central computer 509 such that only one of the switches SWA and SWB will be closed at a given time.

In a similar fashion, switches SWC–SWF are provided to interconnect the control circuit 501 to the solenoids. As stated in connection with switches SWA and SWB, only one of the switches SWC–SWF may be closed at any given time and their operation is also controlled by the central computer 509. Closure of any of these switches will interconnect the control circuit 501 to the solenoids as follows: switch SWC interconnects the control circuit 501 to solenoids S1 and S5; SWD interconnects the control circuit 501 to solenoids S2 and S6; switch SWE interconnects the control circuit 501 to solenoids S3 and S7; and switch SWF interconnects the control circuit 501 to solenoids S4 and S8. Like the switches previously described in connection with the driver and control circuits, the switches SWA–SWF are preferably implemented by power transistors.

The foregoing description of various preferred embodiments of the invention has been presented for purposes of illustration and description. It is not intended to be exhaustive or to limit the invention to the precise forms disclosed. Obvious modifications or variations are possible in light of the above teachings. For example, in FIG. 1, the number of driver and control circuits may be inverted. Rather than utilizing the two driver and four control circuits, the invention may be implement with four driver and two control circuits. Similarly, in FIGS. 3 and 4, the number of driver and control circuits may be inverted. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electronic fuel injection control system of the type having a plurality of fuel injection valves, each valve operated by an electromagnetic solenoid, the control system comprising:

at least one driver circuit for supplying power to a selected solenoid;

at least one control circuit for providing controlled operation of the selected solenoid;

a multiplexing means for selectively interconnecting the at least one driver circuit and the at least one control circuit to the terminals of the selected solenoid for selectively energizing the selected solenoid, the means including:

a first switch array having at least two switches selectively interconnecting at least one driver circuit to a first terminal of the solenoids; and a second switch array having at least two switches selectively interconnecting at least one control circuit to a second terminal of the solenoids;

the multiplexing means being interconnected among the at least one driver circuit, the at least one control circuit, and the solenoids so that closure of any single switch from each switch array uniquely selects and energizes a single solenoid.

2. The control system according to claim 1, wherein the multiplexing means is interconnected among the at least one driver circuit, the at least one control circuit, and the solenoids, in such a way that the number of control circuits is less than the number of solenoids.

3. The control system according to claim 1, wherein the multiplexing means is interconnected among the at least one driver circuit, the at least one control circuit, and the solenoids, in such a way that the number of driver circuits is less than the number of solenoids.

4. The control system according to claim 1, wherein the product of the number of driver circuits multiplied by the number of control circuits is equal to the number of solenoids.

5. The control system according to claim 4, wherein the switches of the driver and control circuits are transistor switches.

6. The control system according to claim 1, wherein the product of the number of driver circuits multiplied by the number of control circuits is equal to the product of the number of solenoids multiplied by the number of solenoids that may be energized simultaneously.

7. The control system according to claim 1, further including blocking diodes in series connection with the solenoids, the blocking diodes prohibiting reverse current flow through the solenoids.

8. An electronic fuel injection control system of the type having a plurality of fuel injection valves, each valve operated by an electromagnetic solenoid, the control system comprising:

at least one driver circuit for supplying power to a drive terminal of the solenoids, the driver circuit including a current limiting circuit for safeguarding the system from excessive current surges;

at least one control circuit for controlling the current flow through a selected solenoid;

a first array of switches electrically connected in series between the power source and the first terminals of the solenoids; and a second array of switches electrically connected in series between the control circuits and a second terminal on the solenoids;

the first and second arrays of switches being interconnected among the power source, the at least one control circuit, and the solenoids so that closure of any single switch from each array of switches uniquely selects and energizes a single solenoid.

9. The control system according to claim 8, wherein the arrays of switches are interconnected among the power source, the at least one control circuit, and the solenoids, in such a way that the number of control circuits is less than the number of solenoids.

10. The control system according to claim 9, wherein the switches of the first and second arrays of switches are transistor switches.

11. An electronic fuel injection control system of the type having a plurality of fuel injection valves, each valve operated by an electromagnetic solenoid, the control system comprising:

at least one driver circuit for supplying power to a drive terminal of the solenoids, the driver circuit including means for providing continuous current flow through a selected solenoid throughout the fuel injection cycle;

at least one control circuit for controlling the current flow through the selected solenoid, the control circuit being configured to operate by pulse width modulating the voltage applied across the selected solenoid to effect a predetermined current flow therethrough;

a first array of transistor switches electrically connected in series between the at least one driver circuit and the drive terminals of the solenoids;

a second array of switches electrically connected in series between the control circuits and control terminals of the solenoids;

the first and second arrays of switches being interconnected among the at least one driver circuit, the at least one control circuit, and the solenoids so that closure of any single switch from each array of switches uniquely selects and energizes a single solenoid; and a central computer having output signals for selectively operating the individual transistor switches of each array of switches.

12. An electronic fuel injection control system of the type having a plurality of fuel injection valves, each valve operated by an electromagnetic solenoid, the control system comprising:

at least one driver circuit for supplying power to the solenoid during a fuel injection cycle, the driver circuit including means for collapsing the magnetic field of a selected solenoid and, thus, rapidly dissipating the energy stored therein at the end of the fuel injection cycle;

at least one control circuit for providing precision control of the current flow through the selected solenoid during the fuel injection cycle;

a first array of switches electrically connected in series between the power source and the first terminals of the solenoids; and a second array of switches electrically connected in series between the control circuits and a second terminal on the solenoids;

the first and second arrays of switches being interconnected among the power source, the at least one control circuit, and the solenoids so that closure of any single switch from each array of switches uniquely selects and energizes a single solenoid.

13. The electronic fuel injection control system according to claim 12, wherein the at least one driver circuit further includes a means for maintaining continuous current flow through the selected solenoid throughout the fuel injection cycle.

14. The electronic fuel injection control system according to claim 13, wherein the means for maintaining continuous current flow includes a flyback diode and a driver switch.

15. The electronic fuel injection control system according to claim 14, wherein a closed current loop for maintaining current flow through the selected solenoid is formed by the flyback diode, the solenoid, and the driver switch, when the driver switch is in the closed position.

16. The electronic fuel injection control system according to claim 12, wherein the means for collapsing the magnetic field includes a speedup diode, a flyback diode, and a driver switch.

17. The electronic fuel injection control system according to claim 16, wherein a closed current loop for dissipating the energy stored in the selected solenoid is formed by the speedup diode, the solenoid, the flyback diode, and a power supply, when the driver switch is in the open position.

18. The electronic fuel injection control system according to claim 12, further including blocking diodes in series connection with the solenoids, the blocking diodes prohibiting reverse current flow through the solenoids.

* * * * *